(12) United States Patent
Kurasawa

(10) Patent No.: US 7,573,555 B2
(45) Date of Patent: Aug. 11, 2009

(54) LIQUID CRYSTAL DISPLAY AND ELECTRONIC APPARATUS

(75) Inventor: Hayato Kurasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 520 days.

(21) Appl. No.: 11/335,462

(22) Filed: Jan. 20, 2006

(65) Prior Publication Data

US 2006/0114382 A1    Jun. 1, 2006

Related U.S. Application Data

(62) Division of application No. 10/960,139, filed on Oct. 8, 2004, now abandoned.

(30) Foreign Application Priority Data

Oct. 10, 2003    (JP) ............................. 2003-352676

(51) Int. Cl.
*G02F 1/1335*    (2006.01)
*G02F 1/1337*    (2006.01)
*G02F 1/1339*    (2006.01)

(52) U.S. Cl. ....................... 349/136; 349/113; 349/114; 349/129; 349/153

(58) Field of Classification Search ................. 349/129, 349/113, 114, 136, 153, 157
See application file for complete search history.

(56) References Cited

U.S. PATENT DOCUMENTS

| | | | |
|---|---|---|---|
| 6,115,098 A | 9/2000 | Kume et al. | |
| 6,266,121 B1 | 7/2001 | Shigeta et al. | |
| 6,501,524 B1 | 12/2002 | Yoshida et al. | |
| 6,661,488 B1 | 12/2003 | Takeda et al. | |
| 6,753,939 B2 | 6/2004 | Jisaki et al. | |
| 6,788,375 B2 * | 9/2004 | Ogishima et al. | ........... 349/130 |
| 6,847,426 B2 | 1/2005 | Fujimori et al. | |
| 7,379,137 B2 * | 5/2008 | Kubo | ......................... 349/114 |
| 7,433,005 B2 * | 10/2008 | Yoshida et al. | .............. 349/114 |
| 7,443,475 B2 * | 10/2008 | Kume et al. | .................. 349/129 |
| 2003/0043326 A1 | 3/2003 | Sawasaki et al. | |

FOREIGN PATENT DOCUMENTS

| | | |
|---|---|---|
| EP | 0 884 626 A2 | 12/1998 |
| JP | A 6-308498 | 11/1994 |
| JP | A 10-161135 | 6/1998 |
| JP | A 11-242211 | 9/1999 |

(Continued)

OTHER PUBLICATIONS

Jisaki et al., "Development of Transflective LCD for High Contrast and Wide Viewing Angle by using Hometopic Alignment," Asia Display/IDW, pp. 133-136, 2001.

*Primary Examiner*—Julie Ngo
(74) *Attorney, Agent, or Firm*—Oliff & Berridge, PLC

(57) ABSTRACT

To reduce the operation time of the manufacturing process by decreasing the delay in the time required for injecting the liquid crystal due to the projections formed on the panel for controlling the alignment of the liquid crystal. Protrusions for controlling the alignment of liquid crystal are disposed throughout a panel. The longitudinal axes of the protrusions are arranged so that they are not in parallel with (or, more specifically, they are substantially orthogonal to) an edge of the panel having a liquid crystal inlet. In this way, the flow resistance of the liquid crystal is reduced, and the liquid crystal can be injected smoothly.

1 Claim, 8 Drawing Sheets

FOREIGN PATENT DOCUMENTS

| | | |
|---|---|---|
| JP | A 11-242225 | 9/1999 |
| JP | A 11-242226 | 9/1999 |
| JP | A 11-258606 | 9/1999 |
| JP | A 11-352494 | 12/1999 |
| JP | A 2000-122044 | 4/2000 |
| JP | A 2002-350853 | 12/2002 |
| JP | A 2003-167253 | 6/2003 |
| JP | A 2003-280019 | 10/2003 |
| JP | A 2003-322858 | 11/2003 |
| KR | 2002-0094639 A | 12/2002 |
| TW | 00509808 | 11/2002 |

* cited by examiner

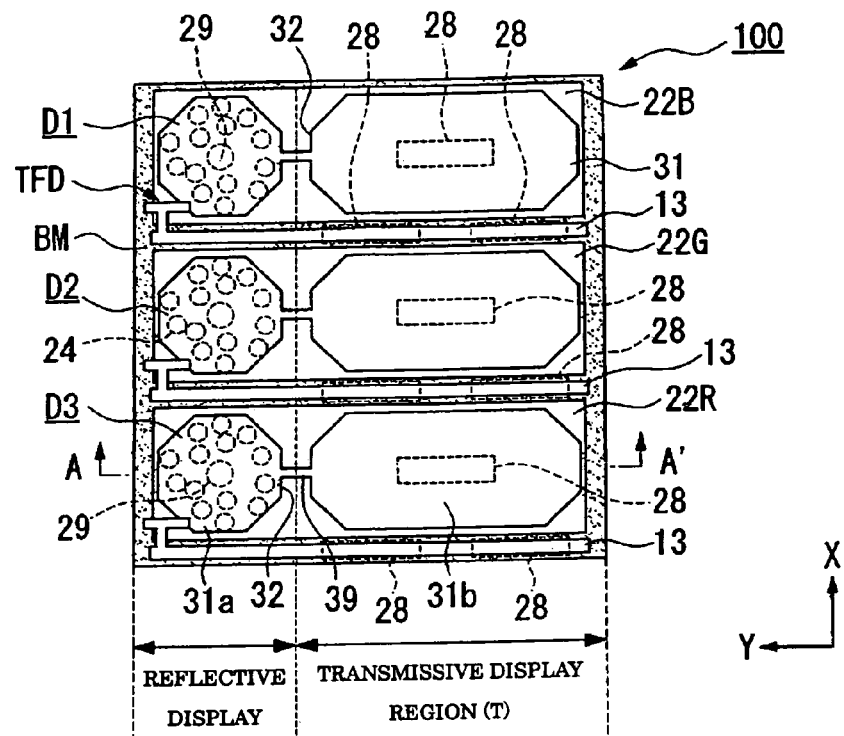
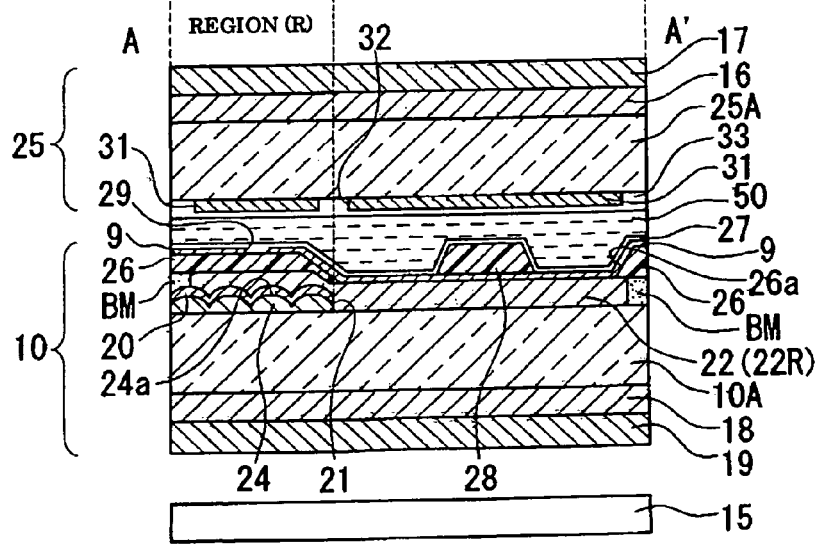
FIG. 3 (a)
FIG. 3 (b)

LIQUID CRYSTAL DISPLAY AND ELECTRONIC APPARATUS

This is a Division of application Ser. No. 10/960,139 filed Oct. 8, 2004. The entire disclosure of the prior application is incorporated by reference herein in its entirety.

BACKGROUND OF THE INVENTION

1. Field of Invention

Aspects of the invention can relate to a liquid crystal display and an electronic apparatus. More specifically, the invention can relate to a liquid crystal display including vertically aligned liquid crystal and providing an image with a high contrast and a wide viewing angle.

2. Description of Related Art

Related art liquid crystal displays can include transreflective liquid crystal displays having a reflective mode and a transmissive mode. One of such transreflective liquid crystal displays includes a liquid crystal layer interposed between an upper substrate and a lower substrate. On the inner surface of the lower substrate there is a metal reflective film, which, for example, is composed of aluminum, having a window for transmitting light. The reflective film functions as a transreflective plate. In such a case, in the reflective mode, external light entering from the upper substrate passes through the liquid crystal layer, and is reflected at the inner surface of the lower surface. Then, the reflected light passes through the liquid crystal layer again and is emitted from the upper substrate to contribute to the display. In the transmissive mode, light entering from a backlight to the lower substrate passes through the liquid crystal layer via the window on the reflective film. Then, the light is emitted from the upper substrate to the outside to contribute to the display. In other words, within the region with the reflective film, the region where the window is formed is a transmissive display region and the region excluding the window is a reflective display region.

Related art transreflective liquid crystal displays, however, have a problem in that the viewing angle is small in the transmissive mode. This small viewing angle is caused because reflective display can be accomplished by only one polarizer disposed on the side of the viewer due to the structure, wherein a transreflective plate is disposed on the inner surface of a liquid crystal cell, so that parallax is not generated. In other words, the flexibility of the optical design is small. To solve this problem, Jisaki et al., in, "Development of transreflective LCD for high contrast and wide viewing angle by using homeotropic alignment", M. Jisaki et al., Asia Display/IDW'01, p. 133-136 (2001) have proposed a new liquid crystal display using vertically aligned liquid crystal. This related art liquid crystal display has the following three characteristics:

1) A vertical alignment mode in which the negative liquid crystal is vertically aligned by dielectric anisotropy and tilted by an applied voltage.
2) A multi-gap structure in which the thickness of the liquid crystal layer (cell gap) differs in the transmissive display region and the reflective display region. See, for example, Japanese Unexamined Patent Application Publication No. 11-242226 for the multi-gap structure.
3) A multi-domain structure in which alignment protrusion are formed of the center of the transmissive display region on an opposing substrate for omnidirectionally tilting the liquid crystal in the transmissive display region, which is shaped like a regular octagon.

SUMMARY OF THE INVENTION

In a liquid crystal apparatus using a vertically aligned liquid crystal (a liquid crystal having a negative dielectric anisotropy) having a multi-domain structure without being subjected to rubbing, the tilting direction of the liquid crystal molecules must be controlled, as described above, by distorting the electric field in a pixel as a result of forming electrodes on parts of an opening in a pixel or forming dielectric projections on parts of the electrodes. When the alignment of the liquid crystal molecules is not sufficiently controlled, the liquid crystal molecules will be tilted randomly while maintaining a predetermined domain size on a plane. Under such conditions, some parts of the display region will have different optical characteristics, and, as a result, these regions will be defective in that they will appear grainy and uneven.

To maintain a sufficient display quality, an alignment controlling device for controlling the alignment of the liquid crystal molecules, such as dielectric protrusions must be formed in the display region of the panel at a predetermined density. Unfortunately, when dielectric protrusions, are formed as alignment controlling device and the proportion of the area of the panel covered by the protrusions become greater, the protrusions get in the way and the time required for injecting the liquid crystal is increased. In particular, for a multi-gap structure, since the thickness of the cell in the reflective display region is small, the increase in the time required for injecting the liquid crystal becomes long.

An aspect of the invention can provide a liquid crystal display and an electronic apparatus including this liquid crystal display, wherein the liquid crystal display is capable of reducing the operation time of the manufacturing process by decreasing the delay in the time required for injecting the liquid crystal due to the projections formed on the panel for controlling the alignment of the liquid crystal.

To achieve the above-mentioned object, an exemplary liquid crystal display according to the invention can include a panel including a pair of opposing substrates and a liquid crystal layer supplied through a liquid crystal inlet provided on a predetermined edge of the panel and sealed inside the panel. Protrusions for controlling the alignment of the liquid crystal can be disposed unidirectionally over the entire panel and the longitudinal axis of the protrusions are not parallel with the predetermined edge of the panel.

The liquid crystal flows radially from the inlet immediately after it is supplied. Then, after some time, when the liquid crystal reaches both ends of the predetermined edge on which the inlet is provided, the liquid crystal begins to flow orthogonally to the predetermined edge. In other words, the liquid crystal flows radially only in the beginning and then the entire liquid crystal flows linearly in a direction orthogonal to the predetermined edge. Therefore, by not disposing the longitudinal axis of the protrusions in a direction that interrupts the flow of the liquid crystal (i.e., a direction parallel to the predetermined edge), as the above-mentioned structure of the present invention, the liquid crystal can be supplied smoothly.

In the structure above, it is desirable to arrange the longitudinal axes of the projections substantially orthogonal to the predetermined edge. In this way, the flow resistance of the supplied liquid crystal will be minimized.

According to an aspect of the invention, a panel having a plurality of first projections aligned substantially in parallel to the predetermined edge and a plurality of second projections aligned substantially orthogonally to the first projections. In such a case, it is desirable to set the intervals between the first projections larger than the intervals between the second projections.

The flow resistance of the liquid crystal is affected by the density of the projections formed in the midst of the flow. For example, the liquid crystal flows easily in a direction in which the projections are formed in low density and does no flow easily in a direction in which the projections are formed in high density. Thus, by forming projections in low density in parallel with the predetermined edge on the plane on which the liquid crystal flows on, as the above-mentioned structure, the liquid crystal can be injected smoothly.

The structure described above is for a case in which the projections have longitudinal axes. Even when the projections do not have longitudinal axes (for example when the liquid crystal molecules have an isotropic shape such as a cone, a regular pyramid, or a hemisphere), the flow resistance of the supplied liquid crystal can be reduced as long as the density of the projections is set based on the flow direction of the liquid crystal. Therefore, to achieve the above-mentioned object, the structure described below may be applied.

More specifically, the exemplary liquid crystal display according to the invention can include a panel including a pair of opposing substrates and a liquid crystal layer supplied through an liquid crystal inlet provided on a predetermined edge of the panel and sealed inside the panel. Protrusions for controlling the alignment of liquid crystal in the panel can be disposed substantially in parallel with and substantially orthogonally to the predetermined edge of the panel, and the density of the protrusions disposed in a first axial direction substantially in parallel with the predetermined edge of the panel (i.e., the proportion of the area occupied by the protrusions within a predetermined area when viewed along the first axial direction) projected onto the first axis is smaller than the density of the plurality of the protrusions disposed in a second axial direction substantially orthogonal to the predetermined edge of the panel projected on the second axis. Otherwise, the liquid crystal display includes a panel including a pair of opposing substrates and a liquid crystal layer supplied through an inlet provided on a predetermined edge of the panel and sealed inside the panel, wherein a plurality of protrusions for controlling the alignment of liquid crystal is disposed substantially in parallel with and substantially orthogonally to the predetermined edge of the panel, and the intervals between the protrusions disposed substantially in parallel with the predetermined edge of the panel is wider than the intervals between the protrusions disposed substantially orthogonal to the predetermined edge of the panel.

According to such an exemplary structure, the protrusions are disposed sparsely on the surface parallel with the predetermined edge of the panel on which the liquid crystal flows. Thus, the liquid crystal can be injected smoothly, and the turnaround time of the manufacturing process can be shortened.

The exemplary liquid crystal display according to the invention may use either a TN mode or a vertically aligned liquid crystal. When a liquid crystal display uses a vertically aligned liquid crystal (i.e., a liquid crystal having a negative dielectric anisotropy whose initial alignment direction is vertical) in the liquid crystal layer, the viscosity of the liquid crystal is high, and a long time is required to supply the liquid crystal. For this reason, the advantage of the invention becomes even more effective. In particular, when the liquid crystal display has a multi-gap structure (or, in other words, when the panel includes dot regions having transmissive display regions and reflective display regions, which include a liquid-crystal-layer thickness-adjustment layer for making the liquid crystal layer thickness of the reflective display region smaller than the liquid crystal layer thickness of the transmissive display region), the cell thickness of the reflective display region becomes small. Consequently, more time is required for supplying the liquid crystal, and, thus, the advantage of the present invention becomes more effective.

An exemplary electronic apparatus according to the invention can include the above-described liquid crystal display. In this way, an electronic apparatus including a display having high display quality can be provided at a low cost.

BRIEF DESCRIPTION OF THE DRAWINGS

This invention will be described with reference to the accompanying drawings, wherein like numerals reference like elements, and wherein:

FIG. 3 is a schematic plan view and a schematic cross-sectional view of the main component of the liquid crystal display according to the first exemplary embodiment of the invention.

DETAILED DESCRIPTION OF PREFERRED EMBODIMENTS

Figure 1:
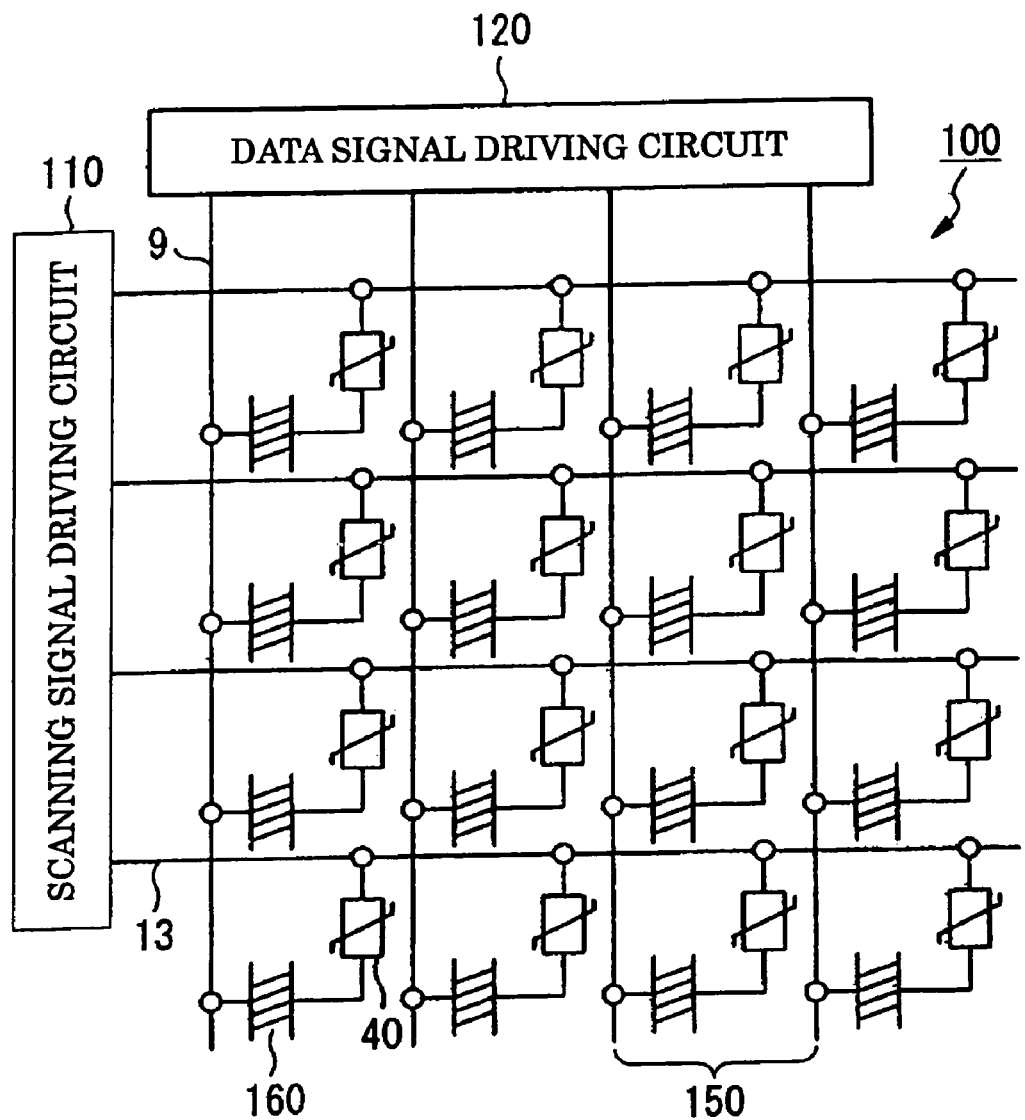
FIG. 1 is an equivalent circuit diagram of a liquid crystal display according to a first exemplary embodiment of the invention.

A first exemplary embodiment of the invention will be described by referring to FIGS. 1 to 4. For each drawing, the size of layers and components are modified to a size that is recognizable in the drawing.

A liquid crystal display according to an exemplary embodiment described below is an active matrix liquid crystal display using a thin film diode (TFD) as a switching element and, in particular, is a transreflective liquid crystal display enabling reflective display and transmissive display.

FIG. 1 illustrates an equivalent circuit of a liquid crystal display 100 according to a first exemplary embodiment of the invention. The liquid crystal display 100 can include a scanning signal driving circuit 110 and a data signal driving circuit 120. The liquid crystal display 100 has signal lines or, in other words, a plurality of scanning lines 13 and a plurality of data lines 9 intersecting with the scanning lines 13. The scanning lines 13 are driven by the scanning signal driving circuit 110 and the data lines 9 are driven by the data signal driving circuit 120. In pixel areas 150, TFD elements 40 and liquid crystal display elements 160 (a liquid crystal layer) are serially connected between the scanning lines 13 and the data lines 9. In FIG. 1, the TFD elements 40 are connected to the scanning lines 13 and the liquid crystal display elements 160 are connected to the data lines 9. Instead, however, the TFD elements 40 may be connected to the data lines 9 and the liquid crystal display elements 160 may be connected to the scanning lines 13.

Figure 2:
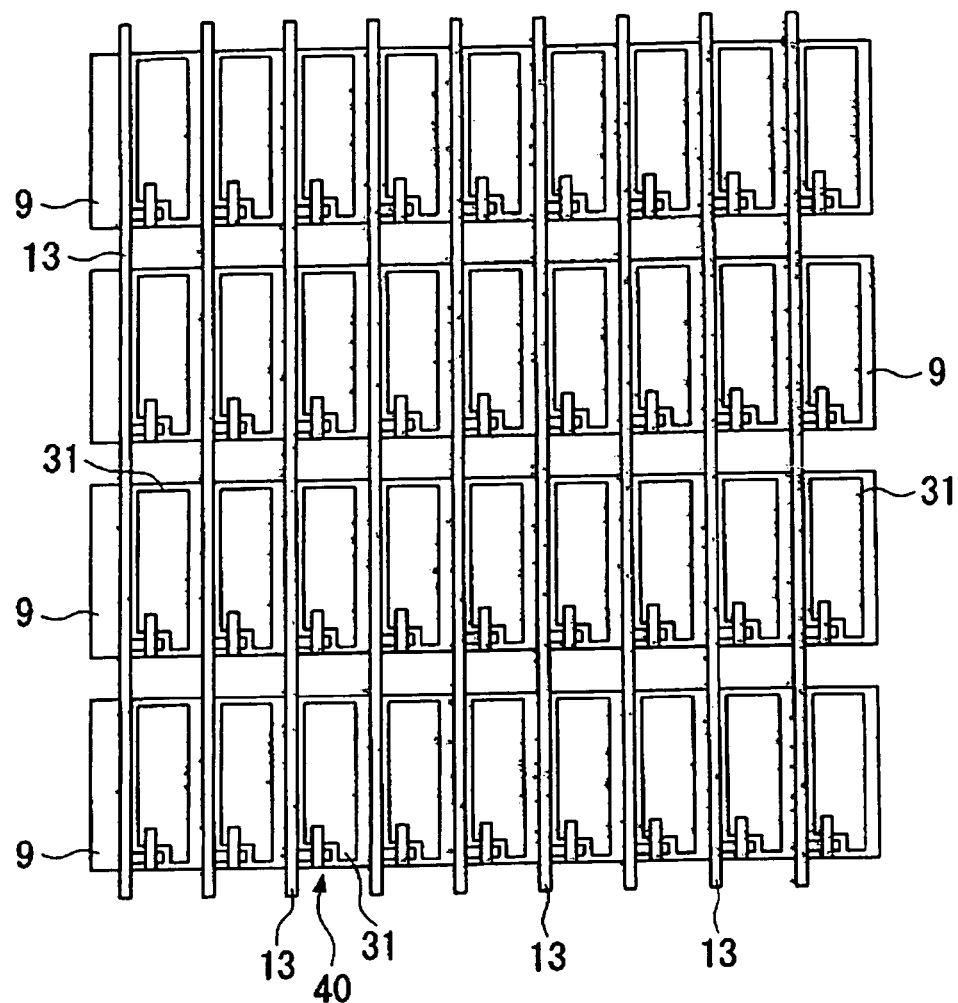
FIG. 2 is a plan view of the structure of dots of the liquid crystal display according to the first exemplary embodiment of the invention.

By referring to FIG. 2, the planar structure (pixel structure) of electrodes included in the liquid crystal display 100 according to the exemplary embodiment will be described. As illustrated in FIG. 2, in the liquid crystal display 100 according to this exemplary embodiment, pixel electrodes 31 having a rectangular shape in plan view and connected to the scanning lines 13 via TFD elements 40 are arranged in a matrix. Stripes of common electrodes 9 face the pixel electrodes 31 and the page of the drawing. The common electrodes 9 are composed of the data lines and are stripes intersecting with the scanning lines 13. In this exemplary embodiment, each region formed on each of the pixel electrodes 31 makes up a dot region. The dot regions arranged in a matrix each include one of the TFD elements 40. In this way, each dot region is capable of displaying a dot.

The TFD elements 40 are switching elements for connecting the scanning lines 13 and the pixel electrodes 31. Each of the TFD elements 40 has an MIM structure including a first conductive film mainly composed of Ta, an insulating film formed on the surface of the first conductive film and mainly composed of $Ta_2O_3$, and a second conductive film formed on the surface of the insulating film and mainly composed of Cr. The first conductive film of each of the TFD elements 40 is connected to one of the scanning lines 13 and the second conductive film is connected to one of the pixel electrodes 31.

The pixel structure of the liquid crystal display 100 according to this exemplary embodiment will be described by referring to FIG. 3. FIG. 3(a) is a schematic plan view of the liquid crystal display 100 and, in particular, the pixel electrodes 31. FIG. 3(b) is a schematic cross-sectional view taken along Line A-A' of FIG. 3(a). The liquid crystal display 100 according to this embodiment has dot regions including the pixel electrodes 31 on the inner side of regions defined by the data lines 9 and the scanning lines 13, as illustrated in FIG. 2. As illustrated in FIG. 3(a), each of the dot regions includes one colored layer corresponding to one of the three primary colors. Three dot regions (D1, D2, and D3) form a pixel including a blue layer 22B, a green layer 22G, and a red layer 22R.

Next, the cross-sectional structure of the liquid crystal display 100 according to this exemplary embodiment will be described. As illustrated in FIG. 3(b), a rectangular sealing material (not depicted in the drawing) is interposed between a pair of opposing substrates 10 and 25. Between these substrates 10 and 25, a liquid crystal initially aligned vertically or, in other words, a liquid crystal layer 50 formed of a liquid crystal material having a negative dielectric anisotropy is interposed. The panel according to this exemplary embodiment of the invention is prepared with the opposing substrates 10 and 25 sandwiching the sealing material. The liquid crystal layer 50 is sealed inside an area surrounded by the substrates 10 and 25 and the sealing material.

The lower substrate (opposing substrate) 10 is prepared by disposing a reflective film 20 composed of a metal film having a high reflectivity, such as an aluminum or silver film, on an insulating film 24, which is further disposed on a part of the surface of a substrate body 10A composed of a translucent material, such as quartz or glass. A color filter 22 (the red layer 22R in the case of FIG. 3(b)) is disposed over the entire lower substrate 10 to cover both the regions with and without the reflective film 20. Here, the region with the reflective film 20 is a reflective display region R and the region without the reflective film 20 or, in other words, an opening 21 in the reflective film 20 is a transmissive display region T. The liquid crystal display 100 according to this embodiment is a vertical alignment liquid crystal display including a vertical-alignment-type liquid crystal layer 50 and is also a transreflective liquid crystal display 100 capable of reflective display and transmissive display.

The insulating film 24 formed on the substrate body 10A has bumps 24a on its surface. The surface of the reflective film 20 disposed over the insulating film 24 also has bumps on its surface. Since reflected light is dispersed by these bumps, reflection of external images can be prevented and the displayed image can have a wide viewing angle. The insulating film 24 having such bumps 24a may be prepared by, for example, patterning a resin resist and applying another layer on this resin resist. Moreover, the bumps 24a may be adjusted by heat processing the patterned resin resist.

The color filter 22 is disposed over both the reflective display region R and the transmissive display region T. The rim of each colored layer making up the color filter 22 is outlined with a black matrix BM composed of elemental chrome. The black matrix BM defines the borders of each of the dot regions D1, D2, and D3 (refer to FIG. 3(a)).

Furthermore, on the substrate 10 at the region corresponding to the reflective display region R, an insulating film 26 is disposed. More specifically, at the reflective display region R, the insulating film 26 is selectively disposed above the reflective film 20. Since this insulating film 26 is disposed, the thickness of the liquid crystal layer 50 differs in the reflective display region R and the transmissive display region T. The insulating film 26 is, for example, composed of an organic film, such as an acrylic resin, having a thickness of about 0.5 to 2.5 µm and includes an inclined plane near the border of the reflective display region R and the transmissive display region T so that the thickness continuously changes. The thickness of the liquid crystal layer 50 in the transmissive display region T without the insulating film 26 is about 1 to 5 µm. The thickness of the liquid crystal layer 50 in the reflective display region R is about half the thickness in the transmissive display region T without the insulating film 26. In this way, the insulating film 26 functions as a liquid-crystal-layer thickness-adjustment layer (liquid-crystal-layer thickness-controlling layer) for changing the thickness of the liquid crystal layer 50 in the reflective display region R and the transmissive display region T.

On the insulating film 26 and the color filter 22, the common electrode 9 composed of indium tin oxide (hereinafter referred to as ITO) is provided. Moreover, protrusions 28 are formed on the common electrode 9 in the region corresponding to the transmissive display region T.

The protrusions 28 function as liquid crystal alignment controlling means for controlling the tilting direction of the liquid crystal molecules and, for example, protrude from the color filter 22 into the liquid crystal layer 50 by a predetermined height (e.g., about 0.05 to 1.5 µm). The protrusions 28 are long in the Y-axis direction. The two side surfaces of each of the protrusions 28 extending in the longitudinal direction (in FIG. 3(a) these are parallel to the Y axis) are inclined at a predetermined angle (or curved slightly) with respect to the main surface of the substrate. In this way, the tilting direction of the liquid crystal molecules when a voltage is applied is controlled so that the molecules tilt in opposite direction on each side of the Y axis. Thus, a multi-domain arrangement becomes possible in each dot.

The common electrode 9 is formed as stripes extending in the vertical direction of the page. The common electrode 9 is disposed on each dot region aligned in the vertical direction of the page. The common electrode 9 has openings 29 for controlling the liquid crystal alignment in the reflective display region R. By forming such openings 29, an oblique electric field is generated between the common electrode 9 and the pixel electrodes 31 in the region where the opening is formed. The tilting direction of the initially vertically aligned liquid crystal molecules is controlled in accordance with the oblique electric field. Accordingly, the alignment of the liquid crystal molecules can be controlled in both the transmissive display region T and the reflective display region R. In particular, in the reflective display region R, the horizontal electric field becomes large since the cell thickness is small compared to the transmissive display region T. The openings 29 formed on the common electrode 9 and notches 32 (described below) in the pixel electrodes 31 are formed so that they do not overlap with each other when viewed from above. Consequently, the tilting direction of the liquid crystal molecules LC between the openings 29 and the notches 32 can be controlled.

The reflective film 20 and the common electrode 9 according to this exemplary embodiment are formed separately. However, a reflective film composed of a metal film may be used as a part of the common electrode in the reflective display region R.

On the common electrode 9 and the protrusions 28, an alignment film 27 composed of polyimide is disposed. The alignment film 27 functions as a vertical alignment film for vertically aligning the liquid crystal molecules relative to the surface of the film. Alignment processing, such as rubbing, is not carried out on the alignment film 27.

The upper substrate (elemental substrate) 25 is made up by disposing a matrix of the pixel electrodes 31 composed of a transparent conductive film, such as ITO, on the substrate body 25A composed of a transmissive material such as glass or quartz (i.e., on the surface of the substrate body 25A facing the liquid crystal layer). Then, an alignment film 33 composed of polyimide processed to have a vertical alignment similar to the lower substrate 10 is disposed over the pixel electrodes 31.

One pixel electrode 31 is disposed for each of the dots D1, D2, and D3. A voltage is applied individually to each of the pixel electrodes 31 by a TFD disposed on each of the dots. Each of the pixel electrodes 31 according to this embodiment includes a plurality (two in FIG. 3) of islands 31a and 31b and a connecting region 39 for electrically connecting neighboring islands. The islands 31a and 31b each make up a subdot; each dot can be divided into a plurality of subdots. The shape of each subdot (islands 31a and 31b) in FIG. 3 is a regular octagon. The shape, however, is not limited to this and may be, for example, a circle or any type of polygon. Between the islands 31a and 31b of the pixel electrodes 31, there are notches 32 (the regions between the islands 31a and 31b excluding the connecting regions 39) formed by cutting off parts of the electrodes. The electrode openings 29 and the protrusions 28 on the substrate body 10A of the lower substrate 10 are formed substantially in the center of the islands 31a and 31b, respectively, when viewed from the top.

On the outer surface of the lower substrate 10 (the surface opposite to the surface facing the liquid crystal layer 50), a wave plate 18 and a polarizing plate 19 are disposed. Also, on the outer surface of the upper substrate 25, a wave plate 16 and a polarizing plate 17 are disposed. In this way, circularly polarized light is incident on the inner surface of the substrate (the surface facing the liquid crystal layer 50). The wave plate 18 and the polarizing plate 19, and wave plate 16 and polarizing plate 17 form circular polarizing plates. The polarizing plate 17 (19) only transmits linearly polarized light having a polarization axis in a predetermined direction. The wave plate 16 (18) is a $\lambda/4$ wave plate. For such a polarizing plate, a combination of a polarizing plate, a $\lambda/2$ wave plate, and a $\lambda/4$ wave plate (i.e., a high-frequency circularly-polarizing plate) may also be used; in such a case, the black color displayed becomes more achromatic. Also, a combination of a polarizing plate, a $\lambda/2$ wave plate, a $\lambda/4$ wave plate, and a c plate (a wave plate having an optical axis in the film thickness direction) may be used to improve the viewing angle. On the outer side of the polarizing plate 19 disposed on the lower substrate 10, a backlight 15 is disposed as a light source for transmissive display.

The liquid crystal layer 50 is prepared by vacuum-injecting liquid crystal through a liquid crystal inlet formed on one of the sides (a predetermined edge of the panel) of the sealing material.

Figure 4:
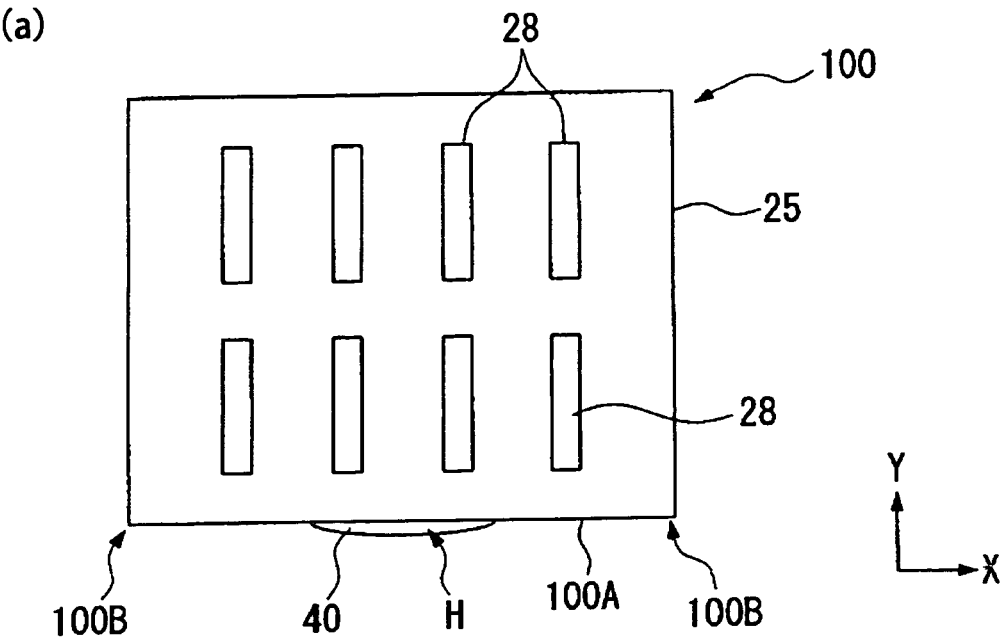
FIG. 4 illustrates the relationship between the positions of a liquid crystal inlet and protrusions of the liquid crystal display according to the first exemplary embodiment of the invention.
Figure 4:
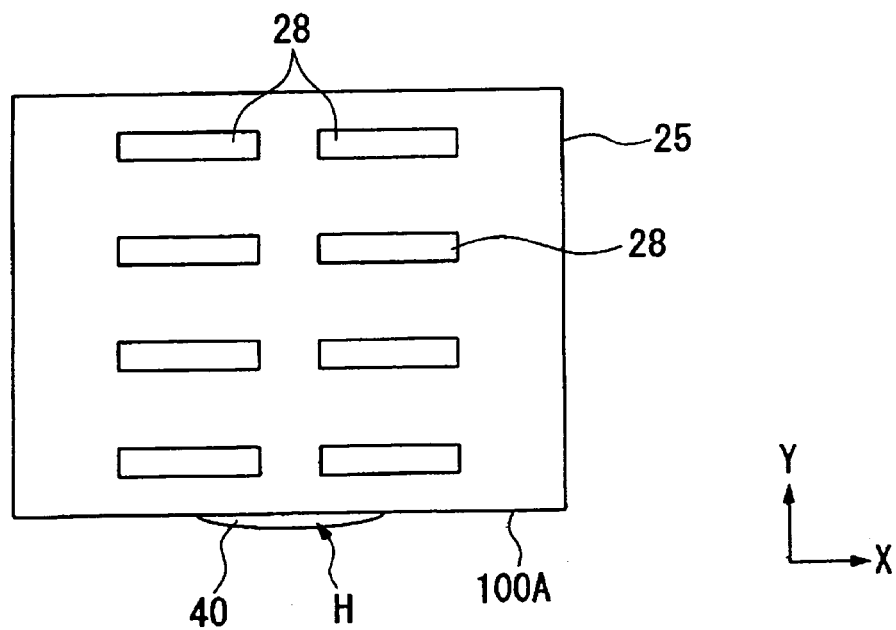

FIG. 4 is a schematic view illustrating the positioning of the protrusions 28 and the edge having the liquid crystal inlet. In the drawing, H indicates the liquid crystal inlet, 100A indicates the panel edge having the liquid crystal inlet H, 100B indicates both ends of the panel edge, and 40 indicates a sealant. The sealing material is not depicted in FIG. 4 since it is disposed along the edge of the substrate 25 (or substrate 10).

According to this exemplary embodiment, the longitudinal axes of the protrusions 28 are arranged in an optimal direction relative to the flow direction of the liquid crystal to shorten the time required for the liquid crystal injection process. More specifically, as illustrated in FIG. 4(a), the longitudinal axes of the protrusions 28 are arranged so that they are not parallel to the direction in which the predetermined edge 100A panel having the liquid crystal inlet H extends (the X-axis direction). In other words, the liquid crystal is injected radially from the inlet H immediately after the injection is started, but, when the liquid crystal reaches the ends 100B and 100B of the panel edge 100A having the inlet H after some time, the liquid crystal begins to flow in a direction orthogonal to the edge 100A (in the Y-axis direction). In other words, the liquid crystal flows radially only at the beginning of injection and, then, starts to flow in the Y-axis direction over the entire panel. Consequently, the liquid crystal can be injected smoothly by disposing the protrusions 28 so that their longitudinal axes are not arranged in a direction that completely blocks the flow of the liquid crystal (i.e., the X-axis direction in parallel with the panel edge 100A), as in FIG. 4(b).

According to this exemplary embodiment, to minimized the flow resistance of the liquid crystal during injection, the longitudinal axes of the protrusions 28 are arranged orthogonally (along the Y-axis direction) to the direction in which the edge 100A extends. The longitudinal axes do not necessarily have to be exactly orthogonal to the edge 100A; even when the longitudinal axes are somewhat tilted the flow resistance can be sufficiently reduced. In fact, the time required for injecting liquid crystal into panels having the structure illustrated in FIG. 4(a) and FIG. 4(b) was measured under the same conditions: the injection time for the panel of FIG. 4(b) was 90 minutes whereas the injection time for the panel of FIG. 4(a) according to this embodiment was only 40 minutes. In other words, by optimizing the direction of the longitudinal axes of the protrusions 28, the liquid crystal injection time can be shorted by at least half.

As described above, the liquid crystal display 100 according to this exemplary embodiment can have the following advantages.

In the liquid crystal display 100 according to this exemplary embodiment, the thickness of the liquid crystal layer 50 in the reflective display region R can be reduced to substantially half of the thickness of the liquid crystal layer 50 in the transmissive display region T by disposing the insulating film 26 at the reflective display region R. Therefore, the retardation contributing to reflective display and transmissive display becomes substantially equal and the contrast of the display is improved.

According to this exemplary embodiment, the tilting direction of the liquid crystal molecules can be controlled when a voltage is applied because of the effect of an oblique electric field due to the inclined surface of the protrusions 28, the openings 29, and the notches 32. Thus, residual images accompanying the generation of a disclination or grainy, uneven spots observed from an oblique angle do not appear easily and high quality display becomes possible.

According to this exemplary embodiment, the longitudinal axes of the protrusions 28, which are means for controlling the alignment of the liquid crystal, are arranged along the flow direction of the injected liquid crystal. Therefore, the flow resistance of the liquid crystal can be reduced, thus shortening the time required to inject the liquid crystal. In particular, the liquid crystal layer 50 according to this exemplary embodiment includes a vertically aligned liquid crystal having a high viscosity and has a multi-gap structure, causing a relatively long liquid crystal injection time. The injection time, however, can be shortened by the above-mentioned structure. In this way, the turnaround time of the manufacturing process can be greatly reduced.

A second exemplary embodiment according to the invention will be described by referring to FIGS. 5 to 7.

Figure 5:
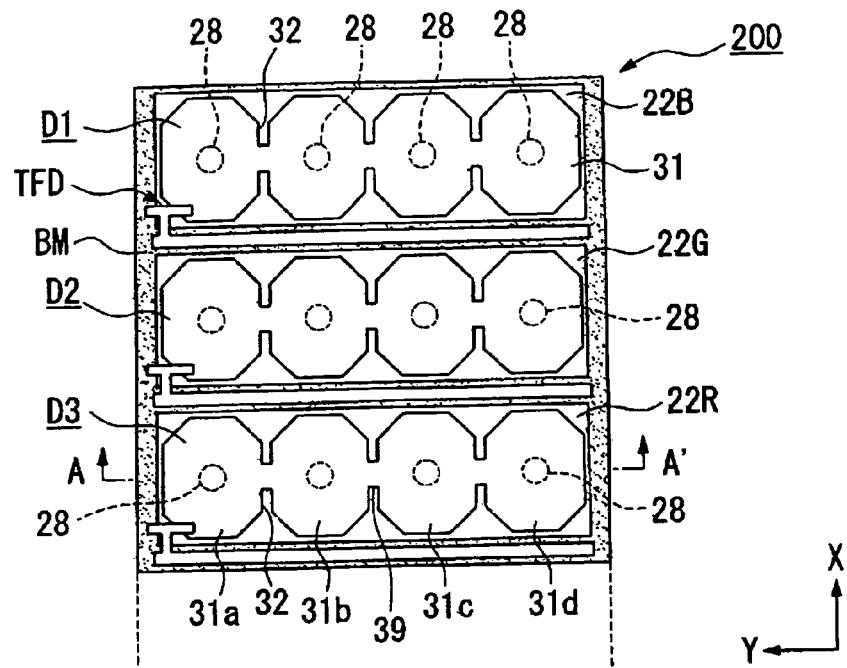
FIG. 5 is a schematic plan view and a schematic cross-sectional view of the main component of a liquid crystal display according to a second exemplary embodiment of the invention.
Figure 5:
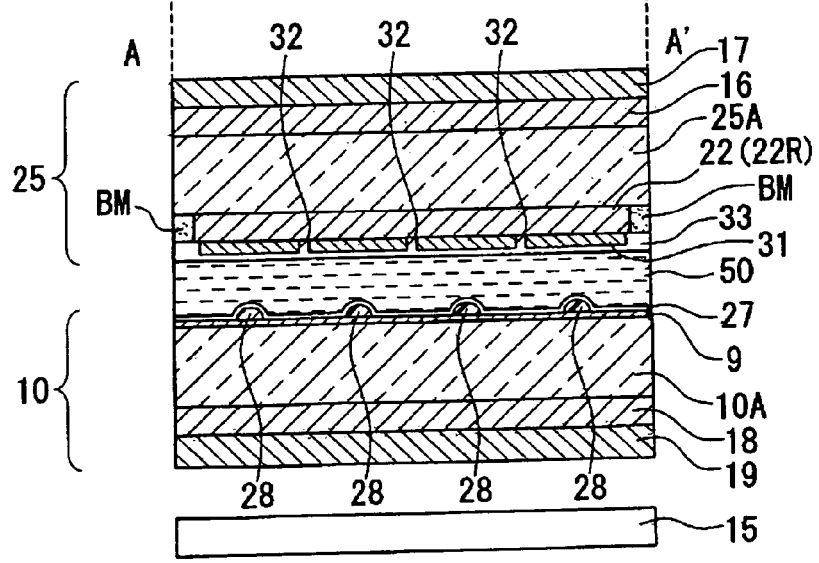

FIG. 5 is a plan view and a cross-sectional view of a liquid crystal display according to this exemplary embodiment and is equivalent to the schematic view of FIG. 3 illustrating the first exemplary embodiment of the invention. Parts and components according to this embodiment that are the same as those in the first embodiment are indicated by the same reference numerals.

A liquid crystal display 200 according to this exemplary embodiment is a transmissive liquid crystal display not having a reflective display region. The liquid crystal display 200 according to this embodiment has dot regions including pixel electrodes 31 inside of regions defined by data lines 9 and scanning lines 13, as illustrated in FIG. 5(*a*). Each of the dot regions includes one colored layer corresponding to one of the three primary colors. Three dot regions (D1, D2, and D3) form a pixel including a blue layer 22B, a green layer 22G, and a red layer 22R.

Next, the cross-sectional structure of the liquid crystal display 200 according to this exemplary embodiment will be described. As illustrated in FIG. 5(*b*), a rectangular sealing material (not depicted in the drawing) is interposed between a pair of opposing substrates 10 and 25. Between these substrates 10 and 25, a liquid crystal initially aligned vertically or, in other words, a liquid crystal layer 50 formed of a liquid crystal material having a negative dielectric anisotropy is interposed. The panel according to this embodiment of the present invention is prepared with the opposing substrates 10 and 25 sandwiching the sealing material. The liquid crystal layer 50 is sealed inside an area surrounded by the substrates 10 and 25 and the sealing material.

A lower substrate (opposing substrate) 10 can include a common electrode 9 composed of ITO disposed on the surface of a substrate body 10A composed of a transparent material such as quartz or glass. Protrusions 28 are formed on the surface of the common electrode 9.

The protrusions 28 function as a liquid crystal alignment controlling device for controlling the tilting direction of the liquid crystal molecules. The protrusions 28, for example, protrude from the common electrode 9 into the liquid crystal layer 50 by a predetermined height (e.g., about 0.05 to 1.5 μm). The protrusions 28 have a surface inclined at a predetermined angle (or curved slightly) with respect to the surface of the substrate. In this way, the tilt of liquid crystal molecules is controlled along the inclined surface. The cross-sectional view of the protrusions 28 is preferably substantially symmetrical. In particular, the shape of the protrusions 28 may preferably be a cone, an elliptical cone, a poly-pyramid, a truncated cone, a truncated elliptical cone, a truncated poly-pyramid, or a hemisphere. In this way, the liquid crystal molecules will tilt in all directions when a voltage is applied, and, thus, a multi-directional multi-domain arrangement becomes possible.

The common electrode 9 is formed of stripes extending in the vertical direction of the page of the drawing. The common electrode 9 is disposed on each dot region aligned in the vertical direction of the page of the drawing. On the common electrode 9 and the protrusions 28, an alignment film 27 composed of polyimide is disposed. The alignment film 27 functions as a vertical alignment film for vertically aligning the liquid crystal molecules relative to the surface of the film. Alignment processing, such as rubbing, has not been carried out on the alignment film 27.

The upper substrate 25 is made up by disposing a color filter 22 (a red colored layer 22R in FIG. 5(*b*)) on the surface of a substrate body 25A composed of a transparent material such as glass or quartz. On the surface of the color filter 22, a matrix of pixel electrodes 31 composed of a transparent conductive film such as ITO is disposed. Then, an alignment film 33 composed of polyimide processed to have a vertical alignment similar to the lower substrate 10 is disposed over the pixel electrodes 31.

One of each of the pixel electrodes 31 is disposed for each of the dots D1, D2, and D3. A voltage is applied individually to each of the pixel electrodes 31 by a TFD disposed on each of the dots. Each of the pixel electrodes 31 according to this exemplary embodiment include a plurality (four in FIG. 5) of islands 31*a*, 31*b*, 31*c*, and 31*d* and a connecting region 39 for electrically connecting neighboring islands. The islands 31*a*, 31*b*, 31*c*, and 31*d* each make up a subdot; each dot can be divided into a plurality of subdots. The shape of each subdot (islands 31*a*, 31*b*, 31*c*, and 31*d*) in FIG. 5 is a regular octagon. The shape, however, is not limited to this and may be, for example, a circle or any type of polygon. Between the islands 31*a*, 31*b*, 31*c*, and 31*d* of each of the pixel electrodes 31, there are notches 32 (the region between the islands 31*a*, 31*b*, 31*c*, and 31*d* excluding the connecting region 39) formed by cutting off parts of the electrode. The protrusions 28 are formed substantially in the center of the subdots (or the islands 31*a*, 31*b*, 31*c*, and 31*d*) when viewed from the top.

On the outer surface of the lower substrate 10 (the surface opposite to the surface facing the liquid crystal layer 50), a wave plate 18 and a polarizing plate 19 are disposed. Also, on the outer surface of the upper substrate 25, a wave plate 16 and a polarizing plate 17 are disposed. In this way, circularly polarized light is incident on the inner surface of the substrate (the surface facing the liquid crystal layer 50). The wave plate 18 and the polarizing plate 19, and wave plate 16 and polarizing plate 17 form circular polarizing plates. The polarizing plate 17 (19) only transmits linearly polarized light having a polarization axis in a predetermined direction. The wave plate 16 (18) is a $\lambda/4$ wave plate. For such a polarizing plate, a combination of a polarizing plate, a $\lambda/2$ wave plate, and a $\lambda/4$ wave plate (i.e., a high-frequency circularly-polarizing plate) may also be used; in such a case, the black color displayed becomes more achromatic. Also, a combination of a polarizing plate, a λ/2 wave plate, a λ/4 wave plate, and a c plate (a wave plate having an optical axis in the film thickness direction) may be used to improve the viewing angle. On the outer side of the polarizing plate 19 disposed on the lower substrate 10, a backlight 15 is disposed as a light source for transmissive display.

Also, in this exemplary embodiment, the liquid crystal layer 50 is prepared by vacuum-injecting liquid crystal through a liquid crystal inlet formed on one of the sides (a predetermined edge of the panel) of the sealing material. According to this embodiment, the longitudinal axes of the protrusions 28 are arranged in an optimal direction relative to the flow direction of the liquid crystal to shorten the time required for liquid crystal injection process.

Figure 6:
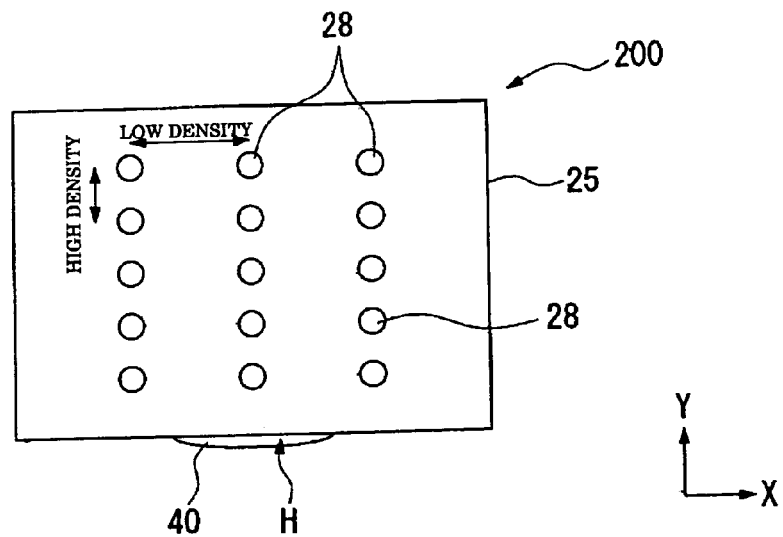
FIG. 6 illustrates the relationship between the positions of an inlet and protrusions of the liquid crystal display according to the second exemplary embodiment of the invention.
Figure 6:
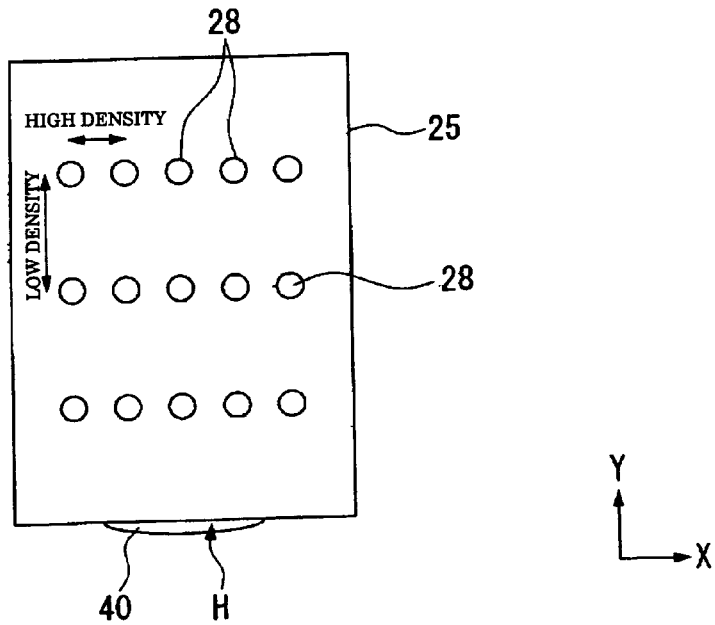

FIG. 6 is a schematic view illustrating the positioning of the protrusions 28 and the edge having the liquid crystal inlet. In the drawing, H indicates the liquid crystal inlet, 100A indicates the panel edge having the liquid crystal inlet H, 100B indicates both ends of the panel edge, and 40 indicates a sealant. The sealing material is not depicted in FIG. 6 since it is disposed along the edge of the substrate 25 (or substrate 10).

In this exemplary embodiment, unlike the first exemplary embodiment, the protrusions 28 are not oblong. Therefore, in this embodiment, to reduce the flow resistance of the liquid crystal during injection, the density of the disposed protrusions 28 is varied according to the alignment direction. More specifically, as illustrated in FIG. 6(*a*), the density of the protrusions 28 aligned in parallel with the panel edge 100A having the liquid crystal inlet H (or, aligned along the X-axis direction) projected onto the X axis (i.e., the proportion of the total area of the protrusions 28 per unit axis length along the X axis direction) is smaller than the density of the protrusions 28 aligned orthogonally to the panel edge 100A (or, aligned along the Y-axis direction) projected onto the Y axis. Since the protrusions 28 according to this embodiment have an isotropic shape, such as a cone, the above-mentioned structure can be rephrased as follows. The intervals of the protrusions 28 in parallel with the panel edge 100A having the liquid crystal inlet H (or, the protrusions 28 aligned along the X-axis direction) are wider than the intervals of the protrusions 28 orthogonal to panel edge 100A having the liquid crystal inlet H (or, the protrusions 28 aligned along the Y-axis direction).

The flow resistance of the liquid crystal is affected by the density of the protrusions 28, disposed in the path of the flow of the liquid crystal. The liquid crystal, for example, easily flows in a direction having a lower density of protrusions 28 but flows less easily in a direction having a higher density of protrusions 28. Thus, as the above-described structure, by sparsely disposing the protrusions 28 in parallel with the panel edge 100A (along the X-axis direction), that is, the surface on which the liquid crystal flows, the liquid crystal can be injected smoothly. The protrusions 28 do not necessarily have to be exactly in parallel with or orthogonal to the edge 100A having the liquid crystal inlet; even when the protrusions 28 are somewhat tilted the flow resistance can be sufficiently reduced.

In fact, the time required for injecting liquid crystal into panels having the structure illustrated in FIG. 6(*b*) having the protrusions 28 aligned in a pattern opposite to the protrusions 28 in FIG. 6(*a*) was measured under the same conditions: the injection time for the panel of FIG. 6(*b*) was 45 minutes whereas the injection time for the panel of FIG. 6(*a*) according to this embodiment was only 30 minutes. In other words, by optimizing the direction of the longitudinal axes of the protrusions 28, the liquid crystal injection time can be shorted by about ⅔.

In FIG. 6(*a*), the number of protrusions 28 aligned in parallel with the panel edge 100A is smaller the number of protrusions 28 aligned orthogonally to the panel edge 100A (in FIG. 6(*a*) the ratio is 3:5). It should be understood that the number of the disposed protrusions 28 is not limited to this ratio. For example, the number of protrusions 28 aligned in either direction may be equal, as illustrated in FIG. 7. It is desirable to minimize the number of protrusions 28 in parallel with the panel edge 100A (along the X-axis direction), that is, the surface on which the liquid crystal flow on as much as possible (more specifically, the number of protrusions 28 in the X direction must be smaller than the number of protrusions 28 in the Y direction). In this way, the injection time of the liquid crystal can be shortened.

Figure 7:
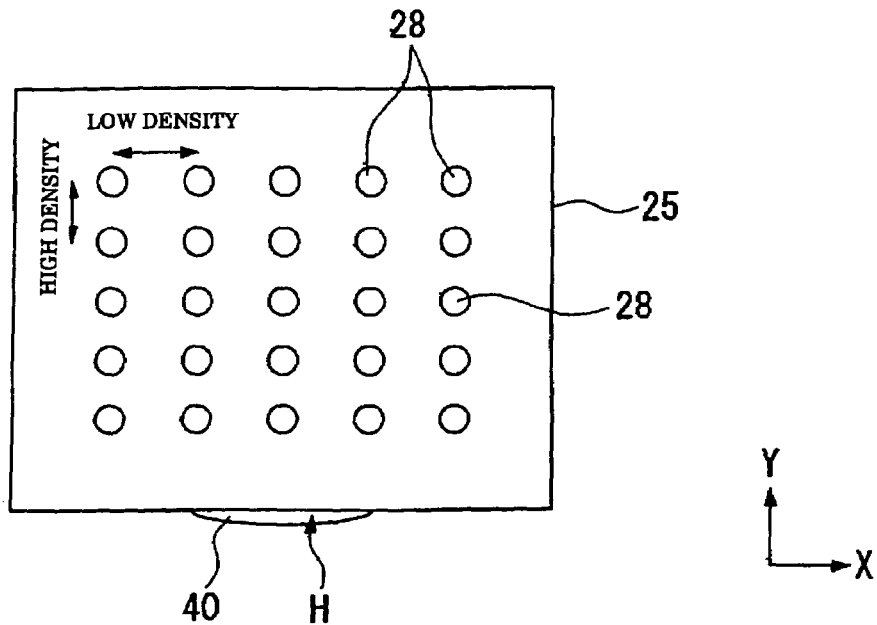
FIG. 7 illustrates another relationship between the positions of an inlet and protrusions of the liquid crystal display according to the first exemplary embodiment of the invention.
Figure 7:
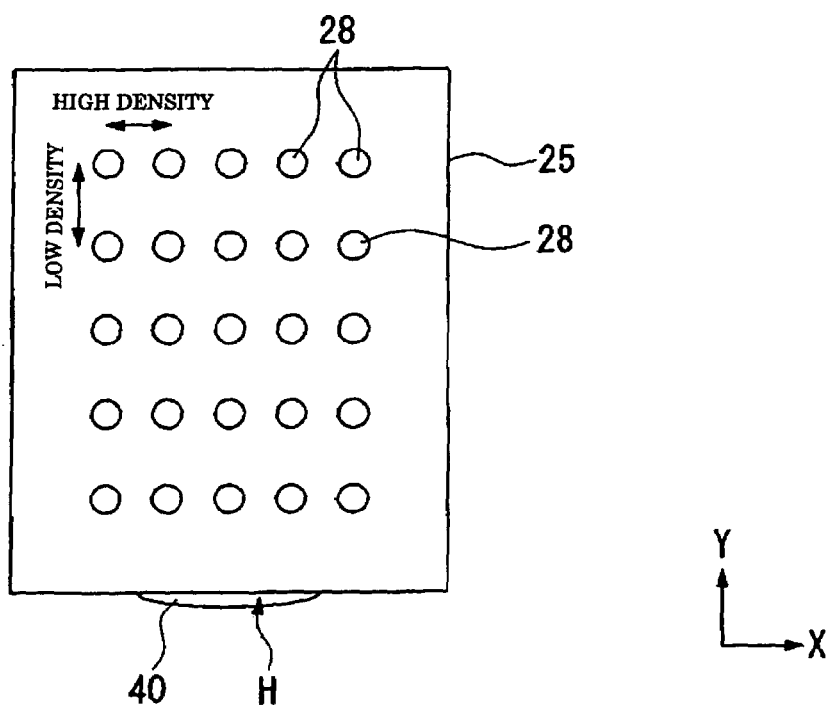

FIGS. 7(*a*) and 7(*b*) are both examples of a case wherein the number of protrusions 28 aligned in the X direction and the number of protrusions 28 aligned in the Y direction are equal. FIG. 7(*a*), similar to this embodiment, illustrates a case in which the density of the protrusions 28 aligned in the X direction is less than the density of the protrusions 28 aligned in the Y direction. FIG. 7(*b*) illustrates a case in which the density of the protrusions 28 aligned in the X direction is greater than the density of the protrusions 28 aligned in the Y direction. For the structure illustrated in FIG. 7(*b*), the liquid crystal injection time was 40 minutes whereas the injection time for FIG. 7(*a*) was 30 minutes. Although the injection time becomes long by increasing the number of protrusions 28 aligned in the X direction (as illustrated in FIG. 7(*b*)), the injection time can be shortened by arranging the protrusions 28 with the above-mentioned density (i.e., arranging the protrusions 28 so that the density of the protrusions 28 aligned in the X direction is less than the density of the protrusions 28 aligned in the Y direction).

Since, as described in this exemplary embodiment, the alignment of the liquid crystal is controlled by the protrusions 28, which are alignment controlling means, residual images accompanying the generation of a disclination or grainy, uneven spots observed from an oblique angle do not appear easily and high quality display becomes possible.

In this exemplary embodiment, the density of the disposed protrusions 28 is optimized based on the flow direction of the injected liquid crystal, the time required for the liquid crystal injection process, and the turnaround time for the entire manufacturing process can be shortened.

Next, an exemplary electronic apparatus having a liquid crystal display according to the above-described embodiments will be described.

Figure 8:
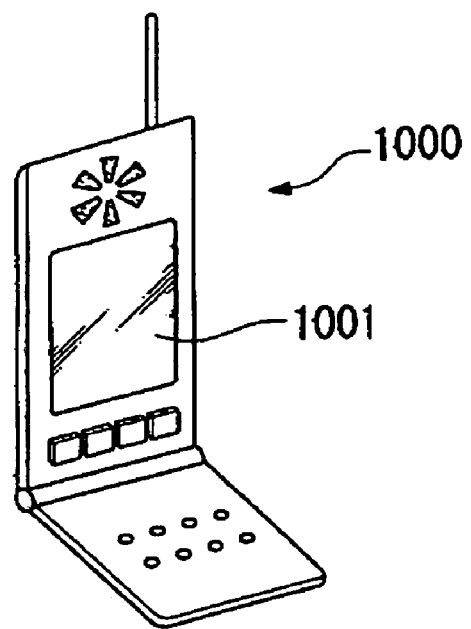
FIG. 8 is a perspective view of an electronic apparatus according to an exemplary embodiment of the invention.

FIG. 8 is a perspective view of a cellular phone according to an exemplary embodiment of the invention. In FIG. 8, the cellular phone body is indicated by the reference numeral 1000, and the display including the above-mentioned liquid crystal display is indicated by the reference number 1001. When the liquid crystal display according to the above-mentioned embodiments is used for the display of an electronic apparatus such as a cellular phone, an electronic apparatus including a bright display having a high contrast and a wide viewing angle can be provided. In particular, since the liquid crystal display 1001 can be supplied at low cost because the turn-around time of the manufacturing process can be shortened, the cost of the entire electronic apparatus can be lowered.

It should be understood that the technical scope of the invention is not limited to the above-mentioned exemplary embodiments. Various modifications may be made within the scope of the present invention.

For example, in the first exemplary embodiment, only the longitudinal axes of the protrusions 28 were optimized relative to the flow direction of the liquid crystal. In addition, the density of the protrusions 28 may also be optimized in the same manner as in the second embodiment. In other words, the intervals of the protrusions 28 aligned in parallel with the panel edge 100A having the liquid crystal inlet H (in the X-axis direction) may be wider than the intervals between the protrusions 28 aligned orthogonally to the panel edge 100A (in the Y-axis direction). In this way, the liquid crystal injection time can be shortened even more.

The liquid crystal display according to the above-mentioned exemplary embodiment of the invention is an active matrix liquid crystal display having a TDF as a switching element. The liquid crystal display according to the invention may be an active matrix liquid crystal display having a TFT as a switching element or a passive matrix liquid crystal display.

What is claimed is:

1. A liquid crystal display device, comprising:

a pair of opposing substrates;

a liquid crystal layer disposed between the substrates, the liquid crystal layer having negative anisotropy;

a seal for sealing the liquid crystal layer and disposed between the substrates, the seal including a liquid crystal inlet corresponding to one edge of at least one of the substrates; and protrusions disposed in between the pair of substrates, the protrusions being for controlling the tilting direction of liquid crystal molecules of the liquid crystal layer, the protrusions being juxtaposed in a matrix including rows and columns of protrusions wherein protrusions aligned in the rows are further aligned in the columns, the rows being aligned substantially parallel with the one edge and the columns being aligned substantially perpendicular to the one edge, the rows being separated from each other by a substantially uniform row interval and the columns being separated from each other by a substantially uniform column interval, the column interval being greater than the row interval.

* * * * *